US005147998A

United States Patent [19]

Tsantrizos et al.

[11] Patent Number: 5,147,998

[45] Date of Patent: Sep. 15, 1992

[54] HIGH ENTHALPY PLASMA TORCH

[75] Inventors: Peter Tsantrizos, Ville St-Pierre; Raynald Lachance, Pincourt; Bruce Hehshaw, Rigaud; Lakis T. Mavropoulos, Montreal, all of Canada

[73] Assignee: Noranda Inc., Toronto, Canada

[21] Appl. No.: 707,009

[22] Filed: May 29, 1991

[51] Int. Cl.[5] ..... B23K 9/00

[52] U.S. Cl. ..... 219/121.5; 219/121.52; 219/121.48; 219/121.51; 219/75

[58] Field of Search ..... 219/121.5, 121.52, 121.48, 219/119, 121.51, 75

[56] References Cited

U.S. PATENT DOCUMENTS 2,941,063 6/1960 Ducati et al. ..... 219/121.52
3,790,742 2/1974 Auer ..... 219/121.52
4,140,892 2/1979 Muller ..... 219/121.50
4,587,397 5/1986 Camacho et al. ..... 219/121.48
4,625,092 11/1986 Camacho et al. ..... 219/121.48
4,882,465 11/1989 Smith et al. ..... 219/121.48
4,891,490 1/1990 Labrot et al. ..... 219/121.52

*Primary Examiner*—Mark H. Paschall
*Attorney, Agent, or Firm*—Fleit, Jacobson, Cohn, Price, Holman & Stern

[57] ABSTRACT

A plasma torch comprises a torch housing, rear and front tubular electrodes coaxially mounted within such housing with a gap therebetween, both electrodes being fabricated from copper having tubular inserts of refractory material, a vortex generator for introducing a tangential flow of gas in opposite direction into the tubular electrodes through the gap between the two electrodes, and a cooling system for cooling the tubular electrodes.

5 Claims, 2 Drawing Sheets

HIGH ENTHALPY PLASMA TORCH

Figure 1:
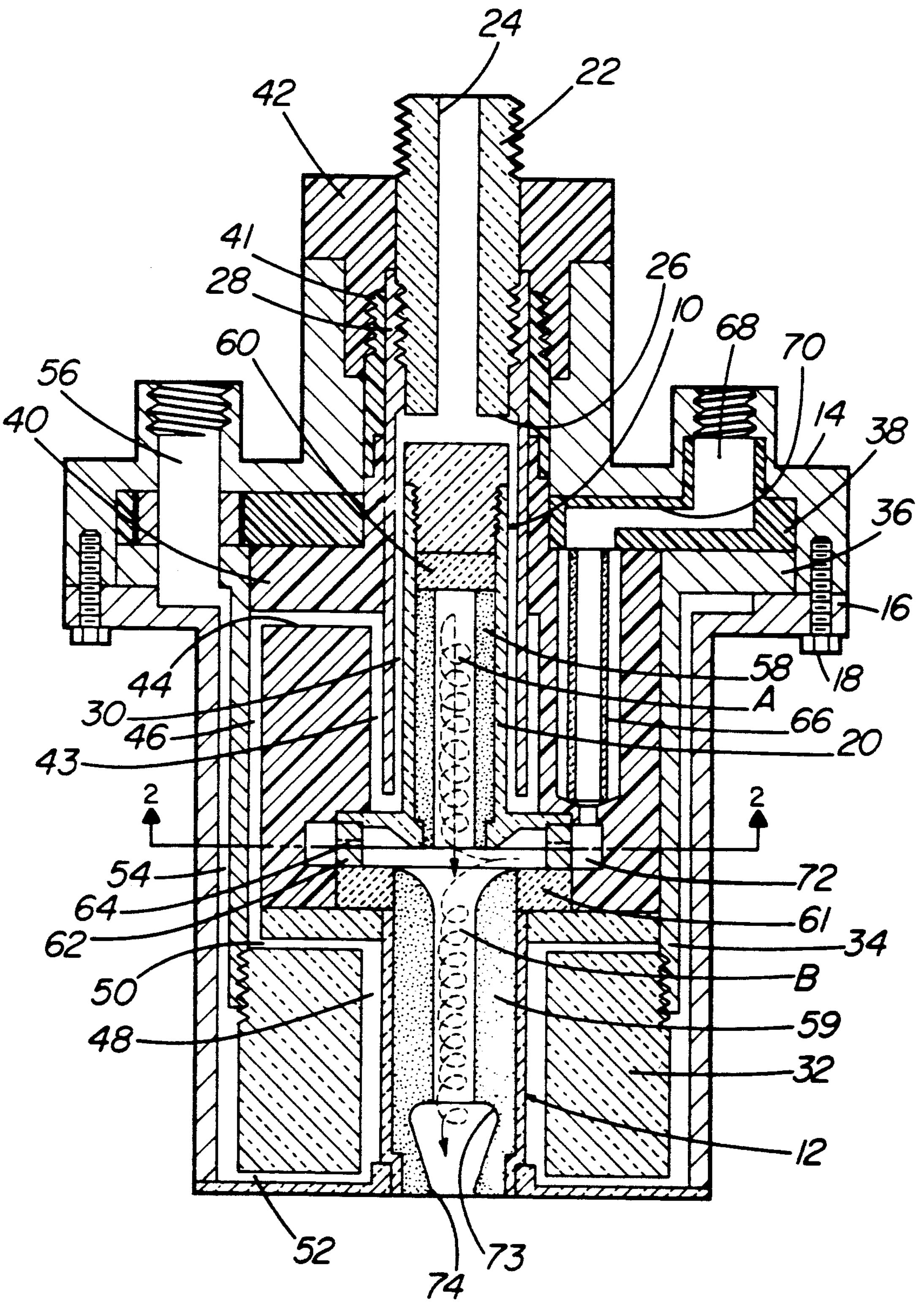

This invention relates to a high enthalpy plasma torch.

Plasmas have been produced using variations of three basic plasma generating devices: r.f. or induction torches, transferred arcs, and d.c. torches. The r.f. torch uses no electrodes and the energy is transferred from a high frequency electromagnetic source to the plasma by induction. However, both the transferred arc and the d.c. torch use electrodes to pass current through a gas thus generating the plasma. The geometry and composition of the electrodes are critical in determining the torch operation and utility. Since this innovation relates primarily to a new electrode configuration for a d.c. torch, a more elaborate discussion of conventional electrode technology is justified.

Two types of d.c. torches are commonly used. The first type uses a conical thoriated tungsten rod as the cathode and a copper tube as the anode. The gas is introduced behind the cathode tangentially, creating a vortex past the cathode and through the anode, which is located in the front of the torch. The arc is attached on one end at the tip of the cathode and is rotated at the other end along the inside surface of the anode. The momentum of the plasmagas vortex, the plasmagas composition, the diameter of the anode and the arc current can be used to control the length of the arc. The anode attachment determines the arc length since the cathode attachment is fixed. These torches, also known as FCC or fluid convective cathode torches, are most commonly used in low power applications, such as plasma spraying, cutting and laboratory investigations. Typical operating characteristics at atmospheric pressure and using nitrogen plasmagas may be: Plasmagas Flowrate =50–100 L/min, Arc Current =200–600 Amperes, Arc Voltage =70–110 Volts, and Plasmagas Enthalpy 1-3 kJ/kg. The fixed cathode attachment prevents the torch from operating at very high currents and the use of thoriated tungsten limits the possible plasmagas compositions to a few inert and reducing gases (e.g. Ar, Ar/$H_2$ mixtures, $N_2$, He). Neither oxygen nor halides can be used as plasmagas. FCC torches are currently being marketed by a wide variety of companies.

The second type of d.c. torch uses two coaxial tubes as the electrodes. The plasmagas is introduced by a vortex generating ring tangentially between the two electrodes creating two vortices in opposite direction. Each vortex pushes an arc attachment away from the vortex generating ring. Thus, the arc elongates and tubular torches offer significantly higher voltages than FCC torches. Tubular torches can employ a variety of electrode compositions with copper being the most common. Thoriated tungsten is not being used as a cathode since it is not fabricated in the required large size tube. An exemption is the small (6 mm I.D., 16 mm O.D) tubular thoriated tungsten cathode used by Nippon Steel Corp. However, that electrode was used in a transferred arc system with the plasma operating between the lip of the tube and an anode located outside the torch.

Tubular torches have been used mostly for melting and as heaters for high temperature reactors. Unfortunately, they need extremely high gas flowrate to stabilize the arc and prevent electrode destruction. Typical operating characteristics for a one MW tubular torch at atmospheric pressure and using nitrogen plasmagas may be: Plasmagas Flowrate =3000–10000 L/min, Arc Current=500–800 Amperes, Arc Voltage=700–2000 Volts, and Plasmagas Enthalpy=0.5–1.5 kJ/kg. Companies such as Plasma Energy Corp. and Aerospatiale are marketing tubular torches. Their most effective role is as air heaters. However, they encounter serious electrode erosion problems at arc currents above 800 A. Conventional tubular torches can not be used whenever low plasmagas flowrate is required as is the case in plasma spraying or in reactors using an inert plasmagas. Furthermore, the tremendous gas flow required prevents them from being economical in many applications. Finally, they can not use any halide plasmagas because the halides would both destroy conventional electrodes and condense in the gas feeding tubes.

It is the object of the present invention to provide a d.c. plasma torch offering higher enthalpy than conventional torches, very low electrode erosion rate, extremely stable operation, high voltage, low plasmagas flowrate, and capable of operating with a metal halide plasmagas.

The plasma torch, in accordance with the present invention comprises a torch housing, rear and front tubular electrodes coaxially mounted within the housing with a gap therebetween, both electrodes being fabricated from copper having tubular inserts of refractory material, a vortex generator for introducing a tangential flow of gas in opposite direction in the tubular electrodes through the gap between the two electrodes, and a cooling system for cooling the tubular electrodes.

A plasmagas feed system is mounted in the housing and includes thermally insulating tubes for preventing condensation of plasmagas onto the cooled electrodes.

The front electrode includes a cup shaped exit portion comprising an expansion followed by a constriction both to create a plasmagas back pressure for improving rotation of the arc inside the electrodes of the torch and thus minimize electrode erosion and to prevent materials from the surrounding atmosphere from entering the electrode region.

The refractory electrode material may be thoriated tungsten or a tantalum carbide composite including tantalum carbide infiltrated with aluminum or copper. Other refractory electrode materials may also be used.

The cooling system comprises a water guide surrounding the rear electrode, a brass cooling jacket surrounding the front electrode, and annular passages in between the water guide and the rear electrode and between the cooling jacket and the front electrode for circulating a cooling liquid in serial relationship around the rear electrode and then around the front electrode.

Figure 2:
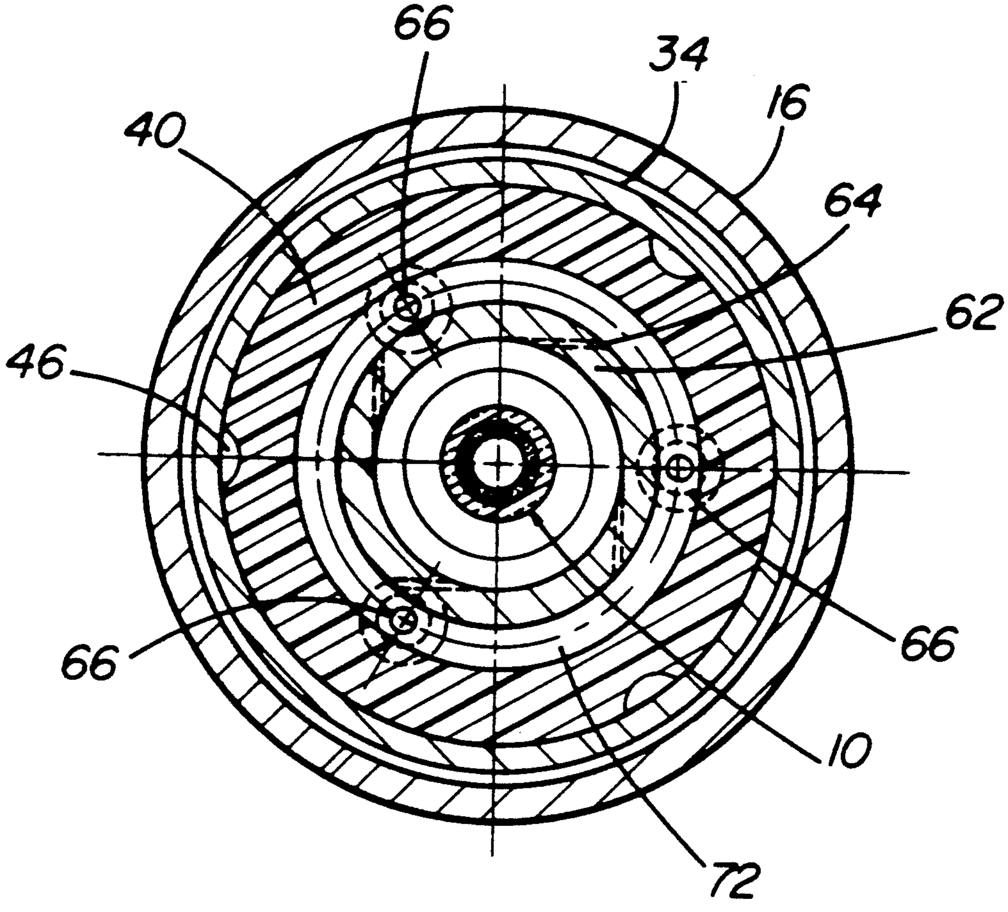

The invention will now be disclosed, by way of example, with reference to the accompanying drawings in which:

FIG. 1 is a sectional view through the plasma torch in accordance with the present invention; and FIG. 2 is a view taken along lines 2—2 of FIG. 1.

Referring to the drawings, there is shown a plasma torch comprising generally a rear electrode (anode) 10 and a front electrode (cathode) 12 which are coaxially mounted within a stainless steel housing made of a rear section 14 and a front section 16 assembled together by bolts 18.

The rear electrode comprises a tubular metal member 20 made of copper which is threadedly mounted to one end of a metal electrode holder 22. The rear electrode holder 22 also serves as a fluid conduit for the torch cooling system and for this purpose the rear end of the holder includes a bore 24 which communicates with radial apertures 26 for the passage of a cooling fluid, such as water. A water guide 28 in the form of a thin walled metal tube is threadedly mounted on the electrode holder and surrounds the rear electrode to form an annular water passage 30 which is part of a fluid cooling system for cooling the rear electrode.

The front electrode 12 is mounted in a brass annular member 32 which is itself threadedly mounted to a stainless steel tubular electrode holder 34 having a flange 36 which is clamped between the rear and front sections 14 and 16 of the housing. The front electrode holder is electrically insulated from the housing by means of an insulating annular member 38 made of a high temperature chemically resistant plastic material.

The front and rear electrodes are electrically insulated from each other by means of an annular insulating member 40 made of a high temperature chemically resistant plastic material which extends rearwardly between the housing portion 14 and the water guide 28. The upper part of the insulating member 40 has an extension made of electrically insulating plastic material 41 which is secured to the housing portion 14 by means of a threaded insulating member 42 also made of electrically insulating plastic material. A narrow annular water passage 43 is provided in the annular insulating member 40 behind the water guide for a purpose to be disclosed later. A plurality of holes 44 communicating with channels 46 are spaced around the annular member 40 and communicate with annular water passage 42 forming part of the fluid cooling system. The brass annular member 32 is also provided with a narrow annular water passage 48 which is part of the cathode cooling system. A plurality of radial holes 50 are provided in the rear end of the brass member 32 for communicating the channels 46 to the annular water passage 48. A plurality of radial holes 52 are also provided for communicating the front end of the water passage 48 with an annular passage 54 formed between the anode holder 34 and the housing 16 to direct the cooling water to an outlet 56.

In accordance with the main feature of the present invention, the copper electrodes 10 and 12 are provided with inserts 58 and 59, respectively, which are attached by high temperature soldering. This make it possible to use a much wider range of electrode materials. Indeed the torch can operate using all suitable refractory electrode materials including both thoriated tungsten or a composite material including tantalum carbide infiltrated with aluminum or copper as disclosed in Canadian Patent Application No. 2,025,619 filed Sep. 18, 1990, and suitable for operation with metal halide plasmagas. The rear end of the refractory insert 58 is insulated from the electrode holder 22 by ceramic electrical insulator 60. Similarly, the rear end of the refractory insert 59 is separated from the plastic insulating material by a ceramic electrical insulating ring 61.

A conventional vortex generating ring 62 is mounted between the rear and front electrodes. The vortex generating ring is provided with tangential holes 64 for creating two gas vortices A and B in opposite directions in the center of the annular anodes and cathodes. Each vortex pushes an arc attachment away from the vortex generating ring 62. Thus the arc elongates and such tubular torches offer significantly higher voltages than the FCC torches.

In accordance with another feature of the present invention, gas is delivered to the vortex generating ring through thermally insulating tubes 66, such as quartz, which prevent condensation of the plasmaqas into the torch body. The plasmagas gas is fed from inlet port 68 through opening 70 in insulating ring 38, tubes 66 and annular passage 72 around the vortex generating ring and into the tangential holes of the vortex generating ring 62.

The front end of the front electrode (cathode) includes an expansion 73 followed by a constriction 74 near to the exit. This design creates a plasmagas back pressure which significantly improves the rotation of the arc inside the electrodes of the torch thus minimizing electrode erosion. It provides a stable arc attachment zone thus minimizing fluctuation in power output. It also confines the arc jet within the expansion thus offering a long and symmetric tail flame ideally suited for cutting, welding and spray-forming operations. Finally, it prevents materials from the surrounding environment from entering the electrode region where they can destroy the electrodes.

The plasma torch cooling system permits to circulate a cooling liquid, such as water, in serial heat exchange relationship with the rear electrode 10 and the front electrode 12. The cooling water enters the torch through the bore 24 in the electrode holder 22. The water than passes through the radial apertures 26 and flows into the annular passage 30 between the outside surface of the rear electrode and the water guide 28 to cool the rear electrode (anode). The water then flows back behind the water guide and into holes 44 in annular insulating member 40 and through channels 46. It is to be noted that holes 44 are located toward the rear portion of the annular insulating member 40 to avoid any possibility of electrical short circuit between the electrodes through the cooling water. The cooling water then passes through holes 50 in bronze cooling jacket 32 and annular passage 48 around the front electrode 12 to cool the front electrode (anode). The water then returns to the water outlet 56 through holes 52 in the front end of the cooling jacket and annular space 54 behind the cooling jacket.

Although the invention has been disclosed, by way of example, with reference to a preferred embodiment, it is to be understood that it is not limited to such embodiment and that other alternative are envisaged within the scope of the following claims.

We claim:

1. A plasma torch comprising:

a) a torch housing;

b) a rear tubular anode electrode and a front tubular cathode electrode coaxially mounted within said housing with a gap therebetween, both electrodes being fabricated from copper having tubular inserts of refractory material forming the arcing surfaces, the front cathode electrode including a cup shaped exit portion comprising an expansion followed by a constriction, the expansion being used to provide a stable arc attachment and the constriction to prevent materials from the surrounding environment from entering the electrode region and both the expansion and constriction being used to create a plasma gas back pressure for improving rotation of the arc inside the electrodes of the torch thus minimizing electrode erosion;

c) a vortex generator for introducing a tangential flow of gas in opposite direction into said tubular electrodes through the gap between the two electrodes; and d) a cooling system for cooling the tubular electrodes.

2. A plasma torch as defined in claim 1, further comprising a plasma gas feed system mounted in said housing and including thermally insulating tubes for preventing condensation of plasma gas onto the cooled electrodes.

3. A plasma torch as defined in claim 1 or 2 wherein said refractory electrode material is thoriated tungsten.

4. A plasma torch as defined in claim 1 or 2 wherein said refractory electrode material is a tantalum carbide composite including tantalum carbide infiltrated with aluminum or copper.

5. A plasma torch as defined in claim 1 or 2, wherein said cooling system comprises a water guide surrounding said rear electrode, a brass cooling jacket surrounding said front electrode and annular passages in between said water guide and said rear electrode and between said cooling jacket and said front electrode for circulating a cooling liquid in heat exchange relationship around the rear electrode and then around the front electrode.

* * * * *

UNITED STATES PATENT AND TRADEMARK OFFICE

CERTIFICATE OF CORRECTION

PATENT NO. : 5,147,998

DATED : September 15, 1992

INVENTOR(S) : Tsantrizos et al

It is certified that error appears in the above-indentified patent and that said Letters Patent is hereby corrected as shown below:

On the title page: Item [75]

Please correct the spelling of the third inventor's surname from "Hehshaw" to --Henshaw--.

Signed and Sealed this

Twenty-first Day of February, 1995

Attest:

BRUCE LEHMAN

*Attesting Officer* *Commissioner of Patents and Trademarks*